(12) United States Patent
Kawashima et al.

(10) Patent No.: US 7,465,084 B2
(45) Date of Patent: Dec. 16, 2008

(54) LIGHT GUIDING PLATE AND BACKLIGHT APPARATUS

(75) Inventors: Yoshinari Kawashima, Kanagawa (JP); Youhei Yamazaki, Chiba (JP); Nobuo Suematsu, Tokyo (JP); Shiro Sugawara, Kanagawa (JP); Nobuaki Kuribara, Saitama (JP); Akira Koshimura, Saitama (JP)

(73) Assignee: Sony Corporation, Tokyo (JP)

( * ) Notice: Subject to any disclaimer, the term of this patent is extended or adjusted under 35 U.S.C. 154(b) by 171 days.

(21) Appl. No.: 10/976,517

(22) Filed: Oct. 29, 2004

(65) Prior Publication Data

US 2005/0117370 A1    Jun. 2, 2005

(30) Foreign Application Priority Data

Oct. 31, 2003    (JP)    ............................. 2003-372752

(51) Int. Cl.
*F21V 7/04*    (2006.01)
(52) U.S. Cl. ...................................... 362/626; 362/620
(58) Field of Classification Search ................. 362/623, 362/625, 624, 606, 607
See application file for complete search history.

(56) References Cited

U.S. PATENT DOCUMENTS

| | | | | | |
|---|---|---|---|---|---|
| 5,040,098 | A | * | 8/1991 | Tanaka et al. ................ | 362/634 |
| 5,584,556 | A | * | 12/1996 | Yokoyama et al. .......... | 362/625 |
| 5,659,410 | A | * | 8/1997 | Koike et al. .................. | 349/62 |
| 5,764,315 | A | * | 6/1998 | Yokota et al. ................ | 349/62 |
| 5,961,198 | A | * | 10/1999 | Hira et al. .................... | 362/621 |
| 5,999,685 | A | * | 12/1999 | Goto et al. ................... | 385/146 |
| 6,068,382 | A | * | 5/2000 | Fukui et al. ................. | 362/625 |
| 6,106,128 | A | * | 8/2000 | Zou et al. .................... | 362/606 |
| 6,685,329 | B2 | * | 2/2004 | Kim et al. .................... | 362/626 |
| 6,788,358 | B1 | * | 9/2004 | Kim et al. .................... | 349/62 |
| 2001/0002165 | A1 | * | 5/2001 | Shinohara et al. ............ | 362/31 |
| 2001/0010630 | A1 | * | 8/2001 | Umemoto .................... | 362/31 |

FOREIGN PATENT DOCUMENTS

JP    2002-270020 A    9/2002
KR    1999-43553    * 10/1999

* cited by examiner

*Primary Examiner*—Anabel M Ton
*Assistant Examiner*—Julie A Shallenberger
(74) *Attorney, Agent, or Firm*—Rockey, Depke & Lyons, LLC; Robert J. Depke

(57) ABSTRACT

A light guiding plate includes: an X axis direction light distribution control section; and a diffuse reflection section. The X axis direction light distribution control section performs light distribution control by which the incident light is deflected such that a tilt of an X axis direction with respect to a normal direction approaches to zero, and outputted from the light emitting surface. A direction of the incident light is the X axis direction, a direction orthogonal to the X axis direction and parallel to the light emitting surface is a Y axis direction, and a direction vertical to the X axis direction and the Y axis direction is the normal direction. The diffuse reflection section reflects the guided incident light from the light incident surface to diffuse in the Y axis direction inside of the light guiding plate and guides to the X axis direction light distribution control section.

6 Claims, 14 Drawing Sheets

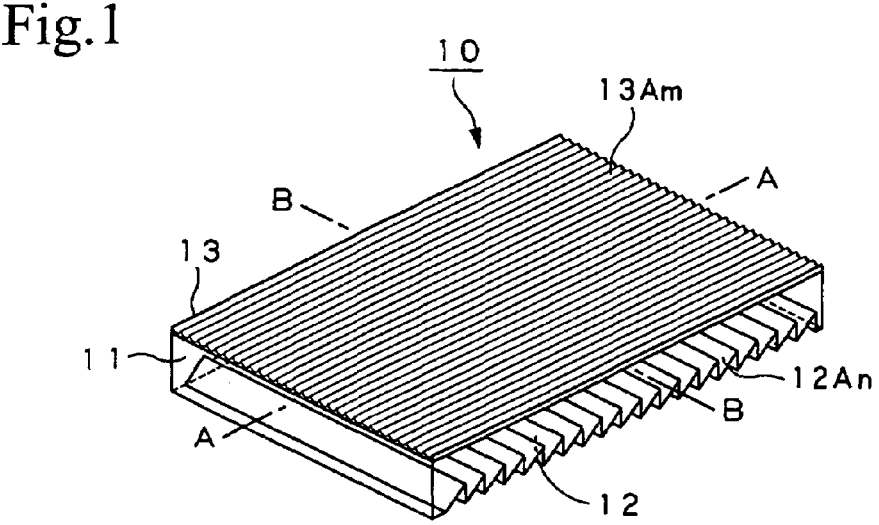
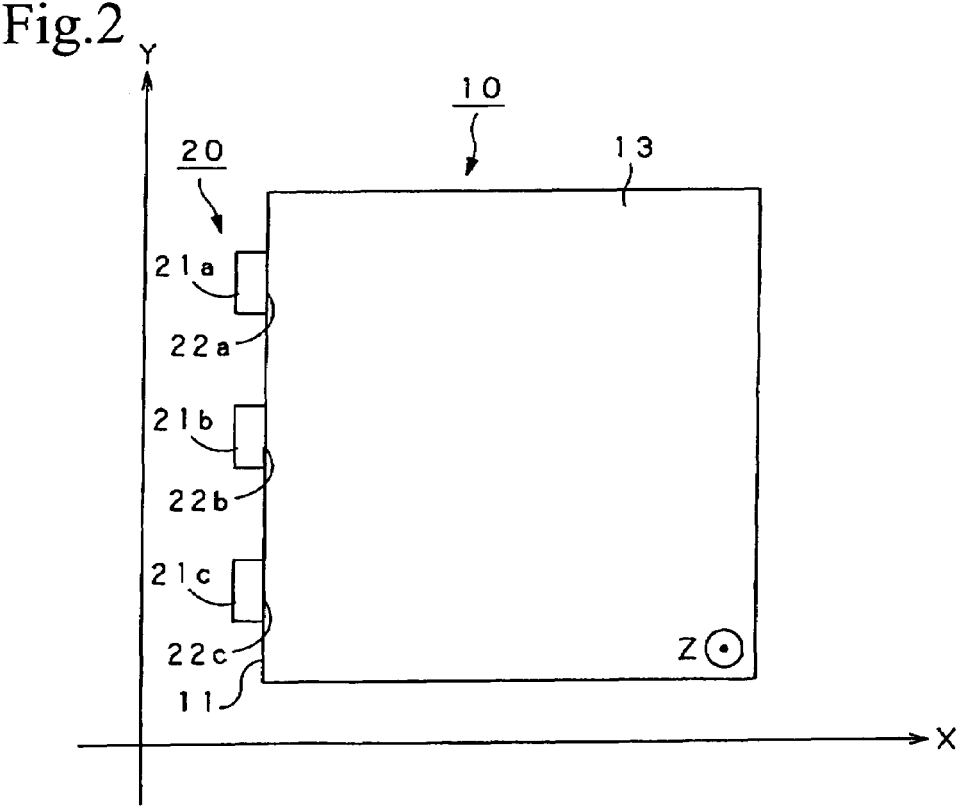

R:0.1/P:0.15

LIGHT GUIDING PLATE AND BACKLIGHT APPARATUS

CROSS REFERENCES TO RELATED APPLICATIONS

The present invention claims priority to its priority document No. 2003-372752 filed in the Japanese Patent Office on Oct. 31, 2003, the entire contents of which being incorporated by reference herein.

BACKGROUND OF THE INVENTION

1. Field of the Invention

The present invention relates to a light guiding plate used in a backlight apparatus for a liquid crystal display (LCD), and the like. Specifically, the present invention relates to a light guiding plate having improvements in front luminance of a light emitting surface, as well as a backlight apparatus provided with the aforesaid light guiding plate.

2. Description of the Related Art

Backlight units that serve as a backlight apparatus for liquid crystal display are in demand and produced in large quantities along with the spread of electronic equipment having a liquid crystal display thereon. The backlight units are mainly formed by a light source, and a light guiding plate for guiding and causing surface emission of light emitted from the light source.

As the light source, fluorescent tubes, light emitting diodes (LED), or the like are used. Especially when mounted on electronic equipment with smaller and thinner form, the light emitting diode is often used.

As shown in FIG. 19, a backlight unit 100, which uses light emitting diodes as the light source, is generally provided with a light guiding plate 80, a plurality of light emitting diodes such as three light emitting diodes 90a, 90b, and 90c, a reflecting sheet 101, a diffusing sheet 102, a first lens sheet 103, and a second lens sheet 104.

The backlight unit 100 is constructed as follows: the light emitting diodes 90a, 90b, and 90c are disposed at a predetermine pitch on a light incident surface 81 of the light guiding plate 80 such that light emitting surfaces 91a, 91b, and 91c are tightly attached thereto; the reflecting sheet 101 is disposed on the light reflecting surface 82 side of the light guiding plate 80; the diffusing sheet 102, the first lens sheet 103 and the second lens sheet 104 are disposed by overlying them in order of mention on a light emitting surface 83 of the light guiding plate 80, and these are housed and assembled in a casing that is not shown. In the following description, the light emitting diodes 90a, 90b and 90c are also generally referred to as a "light emitting diode 90."

The light that is incident on the light incident surface 81 of the light guiding plate 80 from the light emitting diode 90 is guided while causing total reflection with the internal surfaces of the light reflecting surface 82 and the light emitting surface 83 in the light guiding plate 80. On the light reflecting surface 82 of the light guiding plate 80, there are formed a prism pattern for efficiently reflecting upward direction the incident light in the direction of the light emitting surface 83, a dot pattern, and the like. The light incident in a critical angle onto the internal surface of the light emitting surface 83 by these patterns is then emitted from the light emitting surface 83.

The light emitted from the light emitting surface 83, due to considerable variations in the distribution of in-plane light amount, is incident on the diffusing sheet 102 for purposes of homogenization.

The light emitted from the diffusing sheet 102 is deflected so as to enter the first lens sheet 103 and the second lens sheet 104, and condense in the normal direction of the light emitting surface 83.

The directional components of lights, which the first lens sheet 103 and the second lens sheet 104 condense the light passed through the diffusing sheet 102, are different from each other.

The first lens sheet 103 is also called Y direction lens sheet, which is a lens sheet to have the component of the light in the Y axis direction and condense in the normal direction of the light emitting surface 83, when the light guiding plate 80 provided with the light emitting diode 90 is arranged on an X-Y coordinate plane such that the light emitting surface 83 becomes the front, as shown in FIG. 20. On the other hand, the second lens sheet 104 is also called an X direction lens sheet, which is a lens sheet to have the component of the light in the X axis direction shown in FIG. 20 and condense in the normal direction of the light emitting surface 83.

Thus, the front luminance of the backlight unit 100 may be improved efficiently by having the light emitted from the light emitting surface 83 of the light guiding plate 80 and passed through the diffusing sheet 102 pass through the first lens sheet 103 and the second lens sheet 104.

The reflecting sheet 101 disposed on the light reflecting surface 82 side of the light guiding plate 80 functions to reflect the light escaped to the outside of the light reflecting surface 82 so as to bring back to the light guiding plate 80, when the light guiding plate 80 guides the light incident from the light incident surface 81 while causing total reflection.

For example, on of such related art is disclosed by Japanese Patent Application Publication No. 2003-35910.

SUMMARY OF THE INVENTION

Although, the first lens sheet 103 and the second lens sheet 104, which are disposed on the light guiding plate 80 shown in FIG. 19, have extremely strong condensing capability, and a dramatic improving effect of the front luminance may be anticipated, they are extremely expensive parts.

Specifically, in cases where the first lens sheet 103 and the second lens sheet 104 are assembled to the backlight unit 100, the first lens sheet 103 and the second lens sheet 104 occupy several tens of percentages of the total cost of the backlight unit 100. There is a drawback that if a high front luminance is required, an increase in the cost is inevitable.

Accordingly, the present invention is devised in view of such a drawback. It is desirable to provide a light guiding plate capable of causing a surface emission at a uniform luminance free from non-uniformity of luminance, without using any lens sheet, and also obtaining a high front luminance, as well as a backlight apparatus using the aforesaid light guiding plate.

According to one embodiment of the present invention, there is provided a light guiding plate in which: one of side surfaces is taken as a light incident surface; an incident light from the light incident surface is totally reflected and guided with a light emitting surface that is one of main surfaces and a light reflecting surface that is the other main surface; and the light emitting surface provides surface emission. The light guiding plate includes an X axis direction light distribution control section and a diffuse reflection section. The X axis direction light distribution control section performs light distribution control by which the incident light from the light incident surface is deflected such that a tilt of an X axis direction with respect to a normal direction approaches to zero, and outputted from the light emitting surface, where a direction of the incident light is the X axis direction, a direction orthogonal to the X axis direction and parallel to the light emitting surface is a Y axis direction, and a direction vertical to the X axis direction and the Y axis direction is the normal direction. The diffuse reflection section reflects the guided incident light from the light incident surface so as to diffuse in the Y axis direction inside of the light guiding plate and guides to the X axis direction light distribution control section.

According to another embodiment of the present invention, there is provided a backlight apparatus. The backlight apparatus includes: a light guiding plate in which: one of side surfaces is taken as a light incident surface, an incident light from the light incident surface is totally reflected and guided with a light emitting surface that is one of main surfaces and a light reflecting surface that is the other main surface, and the light emitting surface provides surface emission; a light source having a plurality of light emitting elements disposed in row arrangement with a predetermined interval in a lengthwise direction of the light incident surface of the light guiding plate; a reflecting sheet disposed on the light reflecting surface side of the light guiding plate; a diffusing sheet disposed on the light emitting surface side of the light guiding plate; a lens sheet disposed on the diffusing sheet; and a frame for holding the light source, the reflecting sheet, the diffusing sheet and the lens sheet in the light guiding plate. The light guiding plate includes an X axis direction light distribution control section and a diffuse reflection section. The X axis direction light distribution control section performs light distribution control by which the incident light from the light incident surface is deflected such that a tilt of an X axis direction with respect to a normal direction approaches to zero, and outputted from the light emitting surface, where a direction of the incident light is the X axis direction, a direction orthogonal to the X axis direction and parallel to the light emitting surface is a Y axis direction, and a direction vertical to the X axis direction and the Y axis direction is the normal direction. The diffuse reflection section reflects the guided incident light from the light incident surface so as to diffuse in the Y axis direction inside of the light guiding plate and guides to the X axis direction light distribution control section. The lens sheet performs light distribution control by which light emitted from the light emitting surface of the light guiding plate via the diffusing sheet is deflected such that a tilt of the Y axis direction with respected to the normal direction approaches zero, and outputted from the light emitting surface.

The light guiding plate according to the embodiment of the present invention enables to perform a uniform surface emission free from non-uniformity of luminance because the diffuse reflection section reflects the light within the light guiding plate so as to diffuse in the Y axis direction inside of the light guiding plate and guide to the X axis direction light distribution control section, thereby the light emitted from the light emitting surface is diffused also in the Y axis direction.

Further, by using the light guiding plate having the diffuse reflection section and the X axis direction light distribution control section, the backlight apparatus according to the embodiment of the present invention enables to perform a high luminance surface emission free from non-uniformity of luminance, by using, as the lens sheet, only a lens sheet that performs the Y direction light distribution control, because the X axis direction light distribution control, by which the light guided into the light guiding plate is emitted from the light emitting surface, may be performed without causing non-uniformity of luminance in the Y axis direction.

Accordingly, the backlight apparatus of the embodiments enables to lessen the use of lens sheets, thereby allowing a considerable cost reduction and production of thinner apparatuses.

BRIEF DESCRIPTION OF THE DRAWINGS

The above and other objects, features and advantages of the present invention will become more apparent from the following description of the presently exemplary embodiment of the present invention taken in conjunction with the accompanying drawings, in which:

FIG. 1 is a diagram to explain the configuration of a light guiding plate, which is shown as one embodiment of the present invention;

FIG. 2 is a diagram to explain an XY coordinate axis that is set to a light guiding plate;

DETAILED DESCRIPTION OF THE EMBODIMENTS

Figure 3:
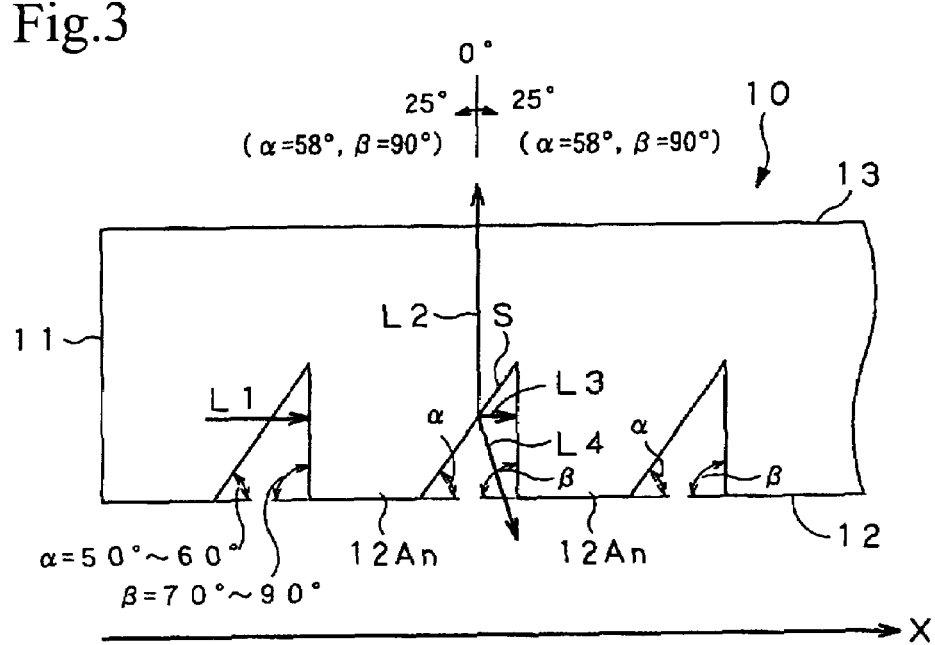
FIG. 3 is a diagram to explain a plurality of prisms formed on a light reflecting surface of a light guiding plate.

A light guiding plate and a backlight apparatus in accordance with one embodiment of the present invention will be described in detail with reference to the drawings.

FIG. 1 shows a light guiding plate 10. For example, the light guiding plate 10 may be used for a backlight unit that is a backlight apparatus of a liquid crystal display.

The light guiding plate 10 is obtained by injection molding with highly transparent material such as acrylic resin. Besides the acrylic resin, transparent thermoplastic resins such as methacrylic resin, styrene resin, polycarbonate resin may be employed as the material for the light guiding plate 10.

In the light guiding plate 10, a light reflecting surface 12 that is one of the main surfaces of the light guiding plate 10, and a light emitting surface 13 that is the other main surface parallel to and opposed to the light reflecting surface 12 perform guiding by use of total reflection of the light incident from a light incident surface 11, and emit it as homogeneous light from the light emitting surface so as to cause surface emission. As described above, the light guiding plate 10 may be of such a shape that the light reflecting surface 12 and the light emitting surface 13 are parallel, or such a wedge shape that the thickness in the guiding direction of the guided light is gradually reduced.

FIG. 2 is a diagram in which the light guiding direction is an X-axis direction, and the light guiding plate 10 is disposed on an XY coordinate plane such that the light emitting surface 13 becomes the front. Thus, when the light guiding plate 10 is disposed on the XY coordinate plane, the emission direction of the light from the light emitting surface 13 becomes a Z-axis direction.

As a light source for emitting light incident from the light incident surface 13 of the light guiding plate 10, there is used a light source provided with a plurality of light emitting diodes, such as a light source section 20 provided with light emitting diodes (LEDs) 21a, 21b and 21c disposed in row at a predetermined interval, as shown in FIG. 2. The light emitting diodes 21a, 21b and 21c provided in the light source section 20 are disposed as described above on a substrate that is not shown in the figure, and are arranged such that light emitting surfaces 22a, 22b and 22c for emitting the light of the respective light emitting diodes are tightly attached to the light incident surface 11 of the light guiding plate 10. In the following description, the light emitting diodes 21a, 21b and 21c are also generally referred to as a "light emitting diode 21," and their respective light emitting surfaces 22a, 22b and 22c are also generally referred to as a "light emitting surface 22." The light emitting diode 21 is, for example, a chip type light emitting diode.

As shown in FIG. 1, on the light reflecting surface 12, a prism pattern composed of n (n is a natural number) prisms 12An is formed in such a way that the prism can efficiently guides the light incident on and guided into the light guiding plate 10 upward in the direction of the light emitting surface 13. The prism pattern of the prisms 12An formed on the light reflecting surface 12 is structured in an injection molding die and formed at the time of injection molding of the light guiding plate 10. Alternatively, the prisms 12An may be formed by so-called direct cutting, by which the light guiding plate 10 is directly machined.

FIG. 3 shows a sectional view when the light guiding plate 10 is cut along the line A-A shown in FIG. 1. As shown in FIG. 3, the prisms 12An, whose cross-sectional shape is a triangle with a base at a side of the light reflecting surface 12, is formed by making, on the light reflecting surface 12, grooves whose base angle on the light incident surface 11 side of the aforesaid triangle is in the range of angle $\alpha=50$ to $60°$, and the other base angle is in an angle $\beta=70°$ to $90°$.

For example, when performing injection molding of the light guiding plate 10, a plurality of convex portions, whose cross-sectional shape is a triangle having base angles of the angle $\alpha=50°$ to $60°$, and the angle $\beta=70°$ to $90°$, may be formed on the internal surface of a cavity of an injection molding die for forming the light reflecting surface 12.

Although in FIG. 1 and FIG. 3, the pitch of the prisms 12An formed on the light reflecting surface 12 is fixed, and there are shown regularly arranged prisms 12An, they may be arranged so as to vary irregularly. Alternatively, it is also possible to vary the pitch for each adjacent prisms 12An. Further, in FIG. 3, the height of the prisms 12An, namely, the depth of grooves made on the light reflecting surface 12 is made constant for illustration. Without limiting to these examples, the present invention may also be applicable to various designs in which the pitch of the prisms 12An and the height of the prisms 12An that is determined by the depth of a groove made on the light reflecting surface 12 are arbitrary set, in order to effectively cause upward-reflection in the normal direction of the light emitting surface 13.

For example, when forming the prisms 12An at a fixed pitch, the depth of a groove may be changed to vary the height of the prisms 12An. When forming the prisms 12An while changing pitches, the depth of a groove may be fixed to have a constant height of the prisms 12An.

As shown in FIG. 3, an incident light L1 incident from the light incident surface 11 of the light guiding plate 10 enters the prism 12An and is divided by a slope S of the prism 12An into a deflected light L2, whose X axis direction component is deflected to the normal direction of the light emitting surface 13, a transmitted light L3 traveling in the X axis direction that is the light guiding direction, and a deflected light L4 that emits to the outside of the light guiding plate 10.

The angle of deflection of the X axis direction component of the deflected light L2 is determined by the angle $\alpha$ and the angle $\beta$ of a plurality of grooves formed on the light reflecting surface 12 at the time of injection molding. As shown in FIG. 3, by setting the angel $\alpha=50°$ to $60°$, and the angle $\beta=70°$ to $90°$, the X axis direction component of the deflected light L2 is deflected to the direction of substantially normal to the light emitting surface 13. The transmitted light L3 enters other prism 12An located at the subsequent stage in the light guiding direction. Although the deflected light L4 is emitted to the outside of the light guiding plate 10, it will be returned into the light guiding plate 10 by a reflecting sheet, which is employed when the light guiding plate 10 is configured as a backlight unit.

Thus, by the prism pattern formed on the light reflecting surface 12 of the light guiding plate 10, the X axis direction component of the light that is incident from the light incident surface 11 and guided into the light guiding plate 10 is subjected to light distribution control, and then deflected and guided upward to the normal direction of the light emitting surface 13 of the light guiding plate 10. Specifically, letting the normal of a light emitting surface 30 be 0°, if grooves are made so as to have for example an angle α=58° and an angle β=90°, the light guided into the light guiding plate 10 is guided upward by the prism 12An formed on the light reflecting surface 12, in the range of about 0° to about 25° in the X axis direction.

Figure 4:
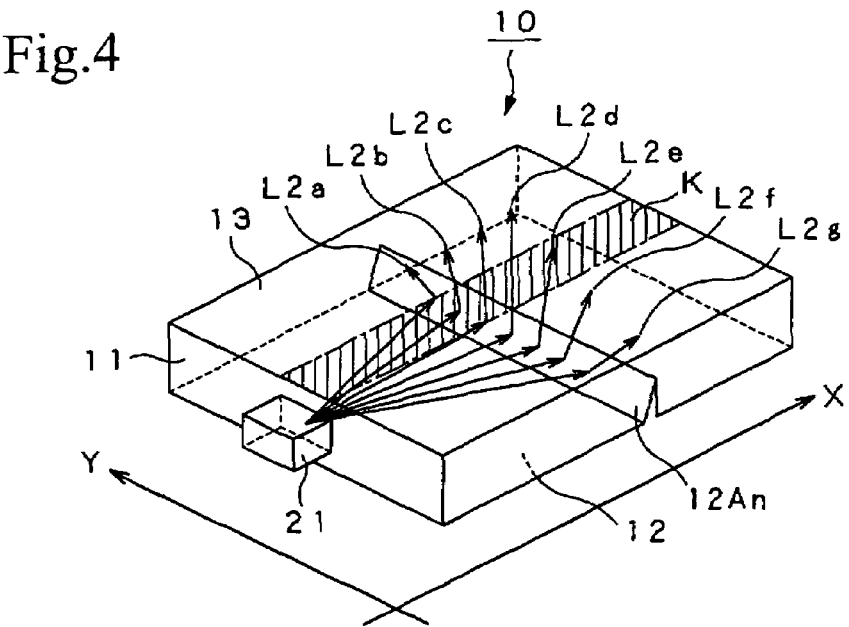
FIG. 4 is a diagram to explain light emitted when only prisms are formed on a light reflecting surface in a light guiding plate.

Meanwhile, the respective light emitting diodes 21 constituting the light source section 20 of the light guiding plate 10 function respectively as a point light source. Therefore the light emitted from each light emitting diode 21 enters the light guiding plate 10, while holding directionality of radially spreading in the Y axis direction, as shown in FIG. 4. The light so entered becomes a deflected light, whose X axis direction component is guided upward to the normal direction of the light emitting surface 13, as described above.

At this time, for example, of the deflected lights L2a to L2g, deflected lights L2a and L2b or deflected lights L2f and L2g, which are lights incident and deflected on the prisms 12An at a wide angle from the light emitting diode 21, have the component guided upward to the vicinity of the normal of the light emitting surface 13 in the X axis direction, whereas in the Y axis direction, they become deflected lights having a component greatly tilted away from the direction of normal.

Figure 5:
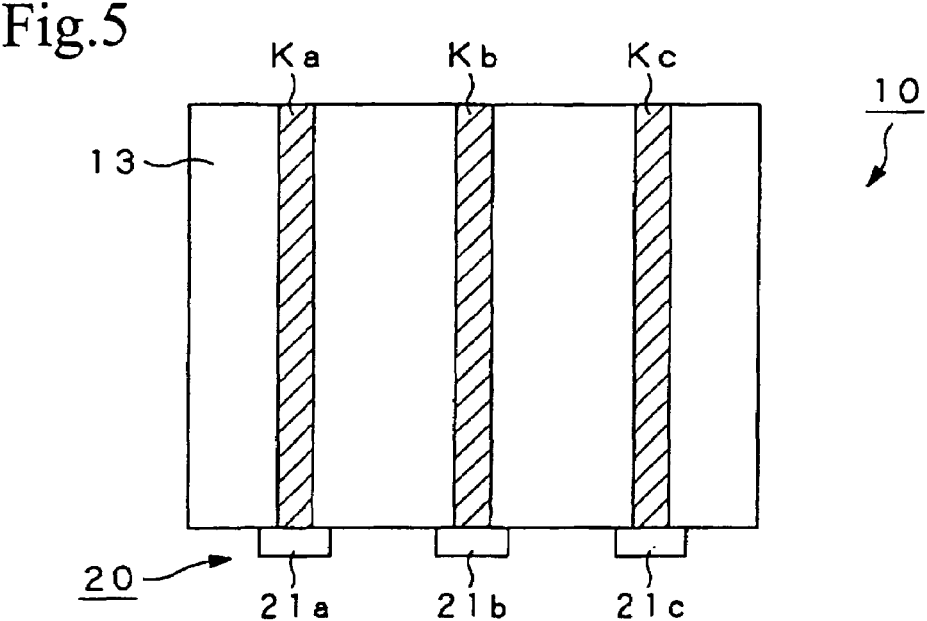
FIG. 5 is a diagram to explain disadvantages when only prisms are formed on a light reflecting surface in a light guiding plate.

Accordingly, the front luminance of the light emitting surface 13 made by such a deflected light is brought into non-uniform one that is high in a line-like region K extending in the X axis direction. For example, as shown in FIG. 5, if the light emitting surface 13 is observed from the front by having light incident on the light incident surface 11 from the three light emitting diodes 21a, 21b and 21c provided in the light source section 20, line-like regions Ka, Kb and Kc would appear in form of stripe.

Thus, the light guiding plate 10, in which the front luminance of light outputted from the light emitting surface 13 would be increased in the line-like regions, fails to exhibit sufficient function as a light guiding plate of the backlight unit of a liquid crystal display.

The reason why in the light guiding plate 10, the front luminance of the light emitting surface 13 causes high regions in the form of line is that the light incident by the light emitting diode 21 enters the prism 12An with directionality. This may produce some light that can be deflected to the direction of normal by the prism 12An in the X axis direction of the light emitting surface 13, but cannot be deflected to the direction of normal in the Y axis direction.

Hence, as shown in FIG. 1, grooves 13Am (m is a natural number), which have a curved surface of an arbitrary radius of curvature R and extend in the X axis direction, are formed at a predetermined pitch and in m rows in the Y axis direction on the light emitting surface 13, so that the light incident and guided into the light guiding plate 10 is reflected by random internal diffusion in the Y axis direction.

Thus, the grooves 13Am formed on the light emitting surface 13 become a cylindrical shape. Although in FIG. 1, all of the radius of curvature R of the grooves 13Am, the depth of the grooves, and the pitch P are fixed for illustration, it should be noted that the present invention allows to design arbitrarily the radius of curvature R of the grooves 13Am, the depth of grooves, and the pitch P in order to effectively perform the internal diffusion in the Y axis direction.

Alternatively, it may also be possible to configure the light guiding plate of the present embodiment at irregular intervals or regularly changing intervals, in the following manner that the radius of curvature R and the depth of grooves are changed per groove 13Am, while fixing the pitch P, or that the pitch P is changed per adjacent groove 13Am while fixing the radius of curvature R and the depth of grooves.

Figure 6:
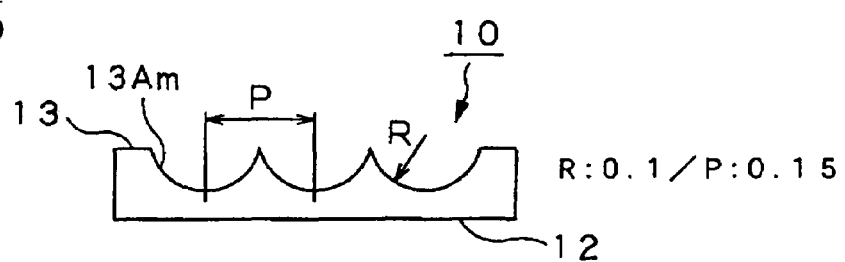
FIG. 6 is a diagram to explain a plurality of grooves formed on a light emitting surface in a light guiding plate.

When the light guiding plate 10 is cut by the line B-B shown in FIG. 1, the cross section of the grooves 13Am is as shown in FIG. 6. The radius of curvature R of the grooves 13Am and the pitch P can be designed as follows: the radius of curvature R=0.1 mm, and the pitch P=0.15 mm, for example.

The cylindrical shape pattern of the grooves 13Am formed on the light emitting surface 13 is formed in an injection molding die and formed at the time of injection molding of the light guiding plate 10. Alternatively, the grooves 13Am may be formed by so-called direct cutting, by which the light guiding plate 10 is directly machined.

In the case of performing injection molding of the light guiding plate 10, the prisms 12An formed on the aforesaid light reflecting surface 12, and the cylindrical shape grooves 13Am formed on the light emitting surface 13 are integrally molded on the light guiding plate 10 at the same time.

Figure 7:
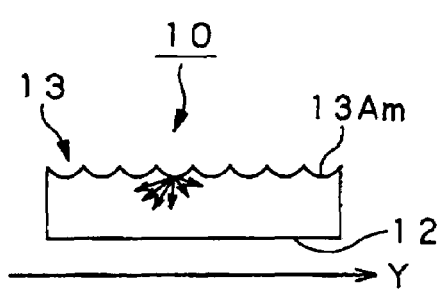
FIG. 7 is a diagram to explain operation of a plurality of grooves formed on a light emitting surface in a light guiding plate.

Thus, by forming the grooves 13Am in m rows on the light emitting surface 13 of the light guiding plate 10, the light incident on the internal surface of the light emitting surface 13 at an angle not less than the critical angle at which the light is guided within the light guiding plate 10, hits any location on the curved surfaces of the grooves 13Am, as shown in FIG. 7, and becomes random because a plurality of the grooves 13Am are formed at regular intervals or irregular intervals. As a result, the reflected light is spread and reflected in the Y axis direction of the light reflecting surface 12. The light reflected by the curved surfaces of the grooves 13Am is incident on the prisms 12An formed on the light reflecting surface 12, and then guided upward such that the component in the X axis direction becomes the normal direction of the light emitting surface 13, as described above.

Figure 8:
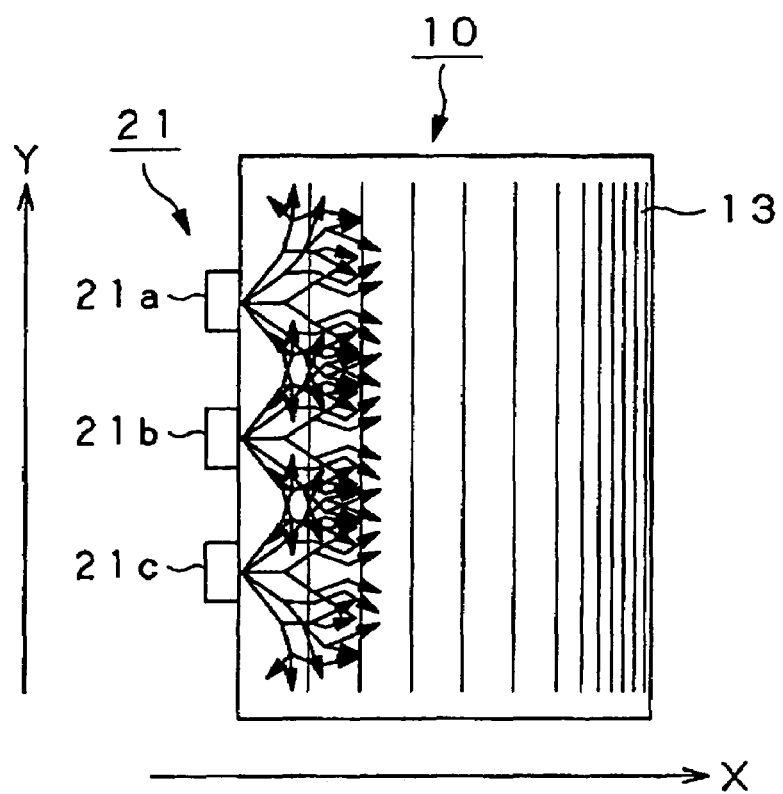
FIG. 8 is a diagram schematically showing that incident light is diffused by a plurality of grooves formed on a light emitting surface in a light guiding plate.

The light reflected by the curved surfaces of the grooves 13Am and guided upward by the prisms 12An is also spread in the Y axis direction, as shown in FIG. 8, and the front luminance of the light emitted from the light emitting surface 13 can be homogenized over the entire surface of the light emitting surface 13. Therefore, there is the effect of diffusing emission lines that appear in the form of stripe, as described above by using FIG. 4 and FIG. 5.

The light incident on the curved surface portions of the grooves 13Am within the light guiding plate 10 is one that the light emitted from the light emitting diodes 21 is directly incident thereon, and light whose X axis direction component is guided upward in the normal direction of the light emitting surface 13 by the prisms 12An. In either light, the grooves 13Am have the effect of diffusing line-like emission lines that occur in the form of stripe.

Thus, by forming the grooves 13Am on the light emitting surface 13 of the light guiding plate 10, it is able to suppress non-uniformity of luminance in which the light guided upward by the prisms 12An formed on the light reflecting surface 12 of the light guiding plate 10 appears as emission lines in the form of stripe, if a plurality of the light emitting diodes 21 that are point light sources are employed as the light source section 20.

For example, as described above, when a plurality of grooves, whose cross-sectional shape is a triangle with the light reflecting surface 12 side as a base, wherein one of the base angles on the light incident surface 11 side of the aforesaid triangle is an angle α=50° to 60°, and the other base angle is an angle β=70° to 90°, are made on the light reflecting surface 12 so as to form the prisms 12An on the light reflecting surface 12, the upward-reflection of the light in the X axis direction is performed effectively, so that emission lines in the form of stripe notably appear, which is especially effective.

Even when forming a plurality of grooves whose cross-sectional shape is a triangle having an angle α=45° and an angle β=45°, which is generally employed as a conventional technique, forming the grooves 13Am on the light emitting surface 13 of the light guiding plate 10 enables to suppress non-uniformity of luminance that appears as emission lines in the form of stripe when the light emitting diodes 21 are used as a point light source.

Figure 9:
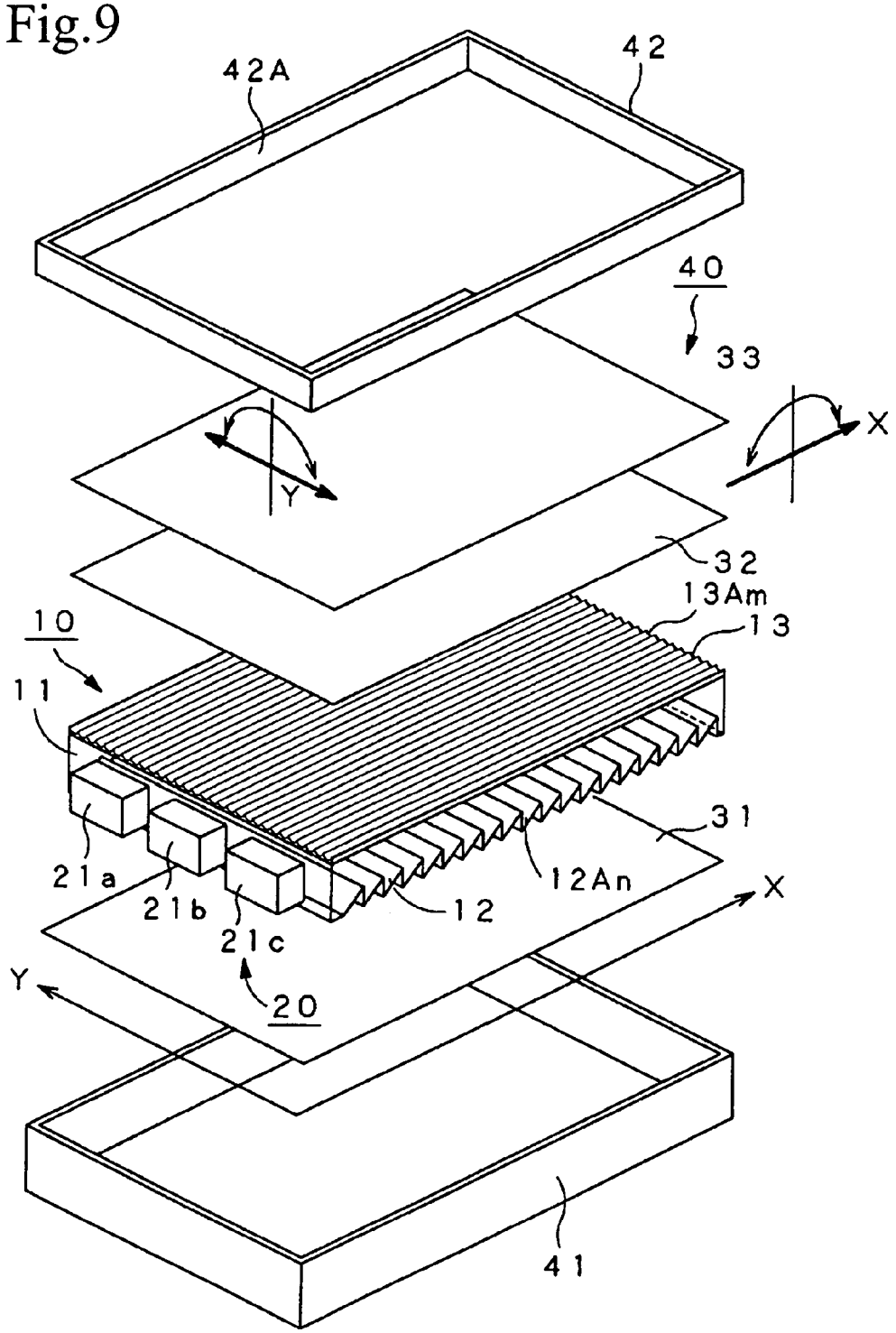
FIG. 9 is a diagram to explain a configuration of a backlight unit using a light guiding plate.

A backlight unit 40 provided with the above-mentioned light guiding plate 10 and the light source section 20 is shown in FIG. 9. In the backlight unit 40, the light source section 20 is disposed on a light incident surface 11 side of the light guiding plate 10, and a reflecting sheet 31 is disposed on a light reflecting surface 12 side of the light guiding plate 10, and a diffusing sheet 32 and a lens sheet 33 are disposed by overlying them in order of mention. The light guiding plate 10, the light source section 20, the reflecting sheet 31, the diffusing sheet 32, the lens sheet 33, which are so disposed, are assembled securely in frames 41 and 42, each serving as a casing of the backlight unit 40.

In this backlight unit 40, the light emitted from the respective light emitting diodes 21 possessed by the light source section 20 is incident and guided from the light incident surface 11 of the light guiding plate 10, and reflected by the light reflecting surface 12 and the reflecting sheet 31, and then emitted from the light emitting surface 13.

At this time, in the light reflecting surface 12 within the light guiding plate 10, the X axis direction component of the light incident on the prisms 12An is subjected to light distribution control, and guided upward and condensed in the normal direction of the light emitting surface 13. The light guided within the light guiding plate 10 is reflected due to internal diffusion in the Y axis direction at the curved surface portions of the grooves 13Am formed on the light emitting surface 13, and then emitted to the prisms 12An. In the light emitted by the prisms 12An, the X axis direction component is guided upward and condensed in the normal direction of the light emitting surface 13 as described above.

Thus, within the light guiding plate 10, the upward reflection in the X axis direction by the prisms 12An, and the internal diffusion by the grooves 13Am are repeated on guide light, and the light is emitted from the light emitting surface 13. The light emitted from the light emitting surface 13 is diffused into homogeneous light by the diffusing sheet 32, and then subjected to light distribution control by the lens sheet 33, so that the Y axis direction component of the light is condensed in the normal direction of the light emitting surface 13. The light emitted from the lens sheet 33 is irradiated through an opening portion 42A opened in the frame 42 to a liquid crystal display, for example.

Thus, the backlight unit 40 does not require the second lens sheet 104 for condensing the component of the X axis direction light in the normal direction of the light emitting surface 83, which is possessed by the backlight unit 100 illustrated for example in the conventional technique. It is therefore able to considerably reduce the cost and also thin the aforesaid backlight unit 40.

The reason for this is as follows. The upward reflection in the X axis direction of guided light becomes sufficient to obtain substantially the same front luminance as in the case of using a lens sheet for condensing in the X axis direction, by making light distribution control under such an appropriate design that a cross-sectional shape of grooves made for forming the prisms 12An on the light reflecting surface 12 of the light guiding plate 10 becomes a triangle in which, letting the light reflecting surface 12 side be a base, the base angle on the light incident surface 11 side is an angle α=50° to 60°, and the other base angle is an angle β=70° to 90°. Thereby, the backlight unit 40 is able to obtain sufficient front luminance over the entire surface of the light emitting surface 13. Thus, when the light guiding plate 10 is configured as the back light unit 40, the light emitted from the light reflecting surface 12 to the outside of the light guiding plate 10 is reflected by the reflecting sheet 31 and returned to the inside of the light guiding plate 10. The directivity of the light emitting diodes 21 is reflected so that the light reflected by the reflecting sheet 31 has directivity.

However, as described above, the light guided within the light guiding plate 10 is subjected to interval diffusion at the curved surface portions of the grooves 13Am formed on the light emitting surface 13 within the light guiding plate 10, so that the directivity thereof is suppressed and becomes light random in the Y axis direction and then enters the prisms 12An. Therefore, the light, which is emitted to the outside of the light guiding plate 10 and reflected by the reflecting sheet 31 and then again incident on the light guiding plate 10, is similarly subjected to internal diffusion and used effectively.

The prism pattern formed on the light reflecting surface 12 may be any shape other than that of the prisms 12An, and the present invention is not limited to this prism pattern.

For example, when the prisms 12An are formed on the light reflecting surface 12 by making grooves whose cross-sectional shape is a triangle, a prism pattern may be formed by changing the values of the angle α and the angle β to a value other than the angle α=50° to 60° and the angle β=70° to 90°. Alternatively, there may be used a prism pattern formed by making grooves having such a cross-sectional shape as described below.

Figure 10:
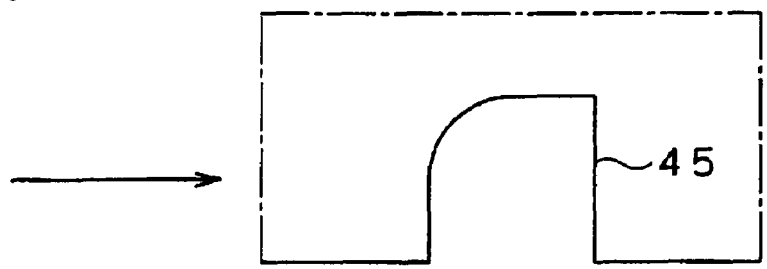
FIG. 10 is a diagram showing one example of a cross-sectional shape of prisms formed on a light emitting surface of a light guiding plate.
Figure 11:
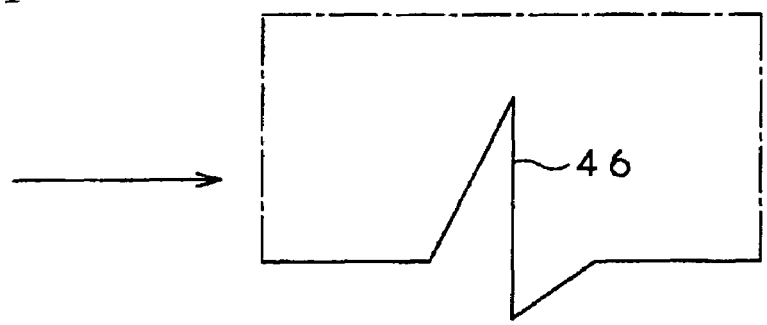
FIG. 11 is a diagram showing other example of a cross-sectional shape of prisms formed on a light reflecting surface of a light guiding plate.
Figure 12:
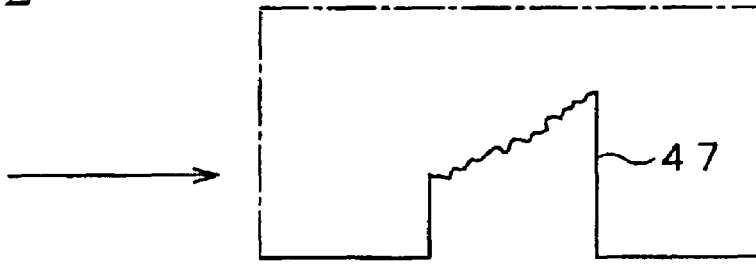
FIG. 12 is a diagram showing a still other example of a cross-sectional shape of prisms formed on a light reflecting surface of a light guiding plate.

For example, a prism pattern may be used which is formed by employing, as the cross-sectional shape of grooves made on the light reflecting surface 12, a rounded trapezoid-like cross-sectional shape 45 as shown in FIG. 10, or a cross-sectional shape 46 composed of two triangles as shown in FIG. 11, or a trapezoid-like cross-sectional shape 47, one side of which has arbitrary irregularities as shown in FIG. 12.

Alternatively, a prism may be formed at the portions of the light incident surface 11 of the light guiding plate 10 at which light emitting surfaces 22 of the respective light emitting diodes 21 make contact. For example, a prism pattern may be formed by making a plurality of grooves, whose cross-sectional shape is a triangle with having its lengthwise direction in the Z axis direction of the light guiding plate 10, at the above-mentioned portions of the light incident surface 11, at the time of injection molding of the light guiding plate 10, or by direct cutting. Accordingly, the intensity distribution of the light incident from the respective light emitting diodes 21 can be controlled, and the surface emission, which is homogeneous free from non-uniformity of luminance, can intentionally be changed to make correction.

Next, in order to verify effects of the internal diffusion in the Y axis direction by virtue of the grooves 13Am formed on the light emitting surface 13 of the above-mentioned light guiding plate 10, there were prepared, as examples of the present invention, a light guiding plate in which prisms are formed by making, on a light reflecting surface, grooves with having a lengthwise direction in the Y axis direction, the cross-sectional shape of the grooves being a triangle with a base in the light reflecting surface side, wherein one of the base angles on a light incident surface side is an angle α=58°, and the other base angle is an angle β=90°; and a light guiding plate in which prisms are formed by making grooves having the same cross-sectional shape, and a plurality of grooves having a radius of curvature R are formed at a predetermined pitch P on a light emitting surface. The X axis direction luminance and the Y axis direction luminance of the respective light guiding plates were measured to determine an emission angle distribution.

EXPERIMENT 1

First, as EXPERIMENT 1, there was prepared a light guiding plate in which prisms were formed by making, on a light reflecting surface, grooves which cross-sectional shape was a triangle with a base in a light reflecting surface side, wherein one of the base angles on a light incident surface side was an angle $\alpha=58°$, and other base angle was an angle $\beta=90°$. Then, an emission angle distribution was measured from a luminance measurement.

Figure 13:
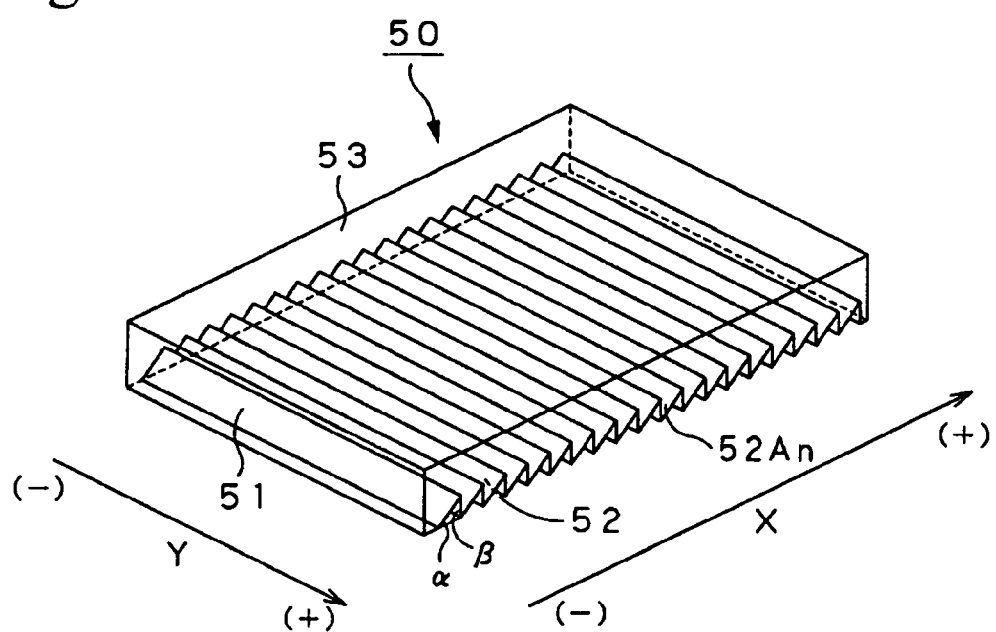
FIG. 13 is a diagram to explain a light guiding plate in which only a plurality of prisms are formed on a light reflecting surface, which was prepared as one embodiment.

As shown in FIG. 13, in a light guiding plate 50 prepared by injection molding with an injection molding die, prisms 52An were formed by making n (n is a natural number) grooves, whose cross-sectional shape was a triangle, on the light reflecting surface 52. The cross-sectional shape of the grooves made for forming the prisms 52An was a triangle with a base in a light reflecting surface side 52 side, wherein one of the base angles on a light incident surface 51 side was an angle $\alpha=58°$, and the other base angle was an angle $\beta=90°$.

The light from a light source (not shown) composed of three light emitting diodes disposed at a predetermined pitch was guided through the light incident surface 51 of the light guiding plate 50, and the X axis direction luminance of the light emitted from the light emitting surface 52, and the Y axis direction luminance were measured to find the emission angle distribution. Letting the measuring point be a central position of the light emitting surface 53, on the X axis, the light incident surface 51 side is a negative direction, and the light guide direction is a positive direction, whereas on the Y axis, the right side with respect to the light guide direction is a positive direction, and the left side is a negative direction.

Figure 14A:
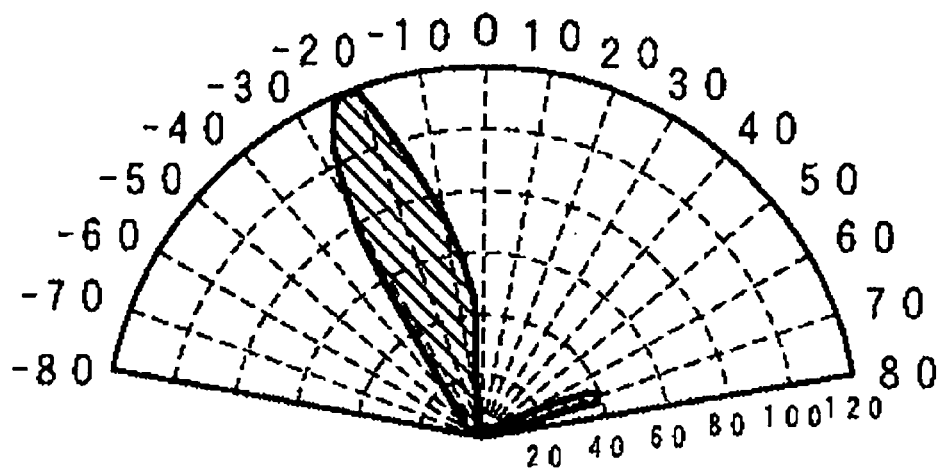
FIG. 14(a) is a diagram showing an emission angle distribution of the luminance in the X axis direction of the light guiding plate shown in FIG. 13.
Figure 14B:
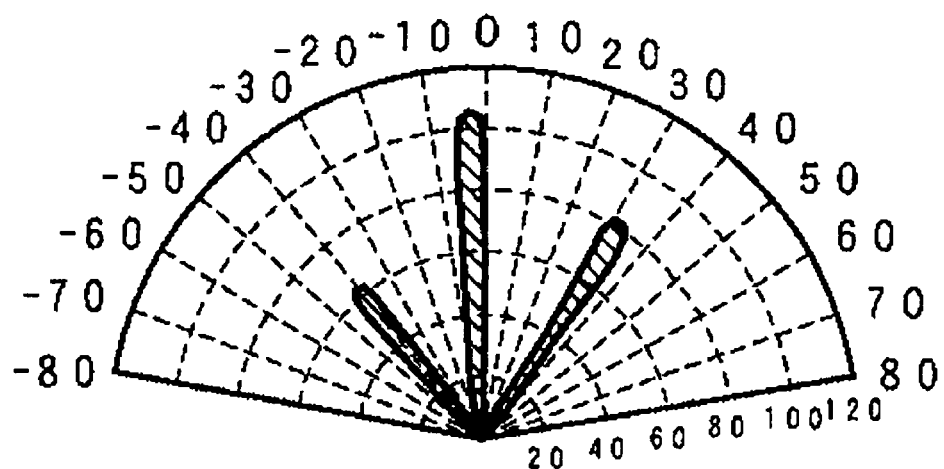
FIG. 14(b) is a diagram showing an emission angle distribution of the luminance in Y axis direction.

The emission angle distribution in the X axis direction of the light guiding plate 50, and the emission angle distribution in the Y axis direction are shown in FIGS. 14(a) and 14(b), respectively. The symbol 0° shown in FIGS. 14(a) and 14(b) indicates the normal direction of the light emitting surface 53. For example, if the luminance distribution is concentrated in the vicinity of 0° in each of FIGS. 14(a) and 14(b), it can be said that both of the X axis direction component and the Y axis direction component in the light emitted from the light emitting surface 53 are condensed to the normal of the light emitting surface 53.

As shown in FIG. 14(a), the distribution in the vicinity of −20° to 0° is high in the X axis direction. This shows that the light was condensed in the normal direction of the light emitting surface 53 in the X axis direction.

As shown in FIG. 14(b), the distribution is increased in the form of peak, around −40°, around 0°, and around 33° in the Y axis direction. This shows that in the Y axis direction, the directivity of the three light emitting diodes (not shown) was directly reflected to cause non-uniformity of luminance in the light emitted from the light emitting surface 53.

Next, a description will be given of a light guiding plate in which prisms are formed by making, on a light reflecting surface, grooves whose cross-sectional shape was a triangle with a base in the light reflecting surface side, wherein one of the base angles on a light incident surface side is an angle $\alpha=58°$, and the other base angle is an angle $\beta=90°$, and a plurality of grooves having a radius of curvature R were formed at a predetermined pitch P on the light emitting surface. As a light guiding plate used in the experiments, two types were prepared by fixing the radius of curvature R of a plurality of grooves formed on a light emitting surface and changing the pitch P. The experiments for finding the respective emission angle distributions of two light guiding plates obtained by changing the pitch P of the plurality of grooves formed on a light emitting surface are referred to as "EXPERIMENT 2" and "EXPERIMENT 3", respectively.

EXPERIMENT 2

Figure 15:
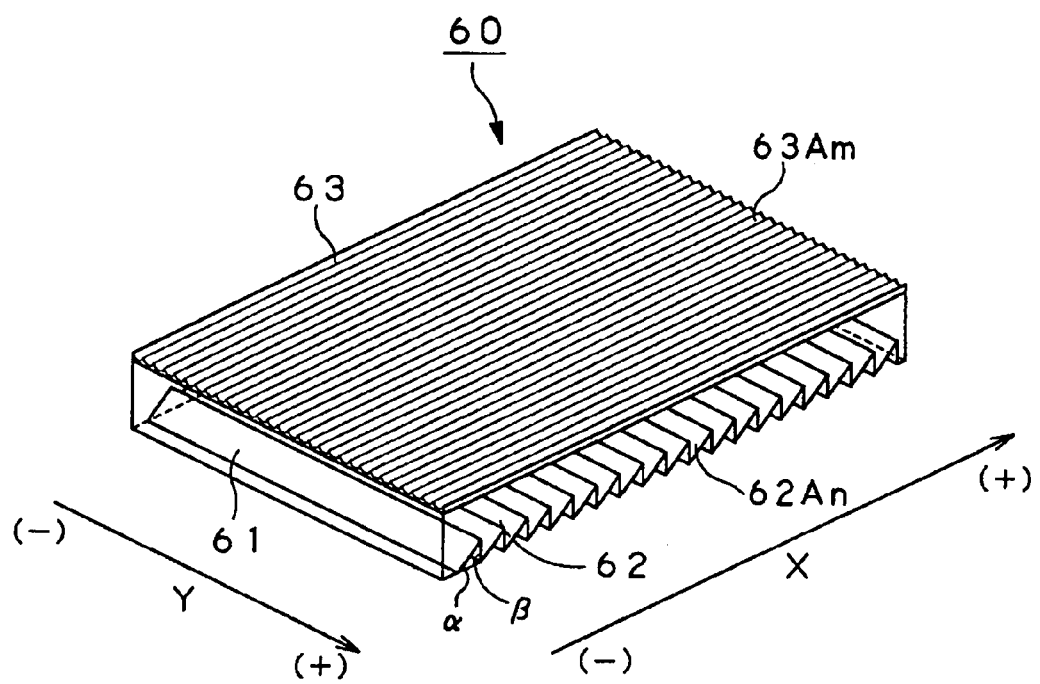
FIG. 15 is a diagram to explain a light guiding plate prepared as one embodiment, in which a plurality of prisms are formed on a light reflecting surface, and a plurality of prisms are formed on a light emitting surface.

As shown in FIG. 15, a light guiding plate 60 prepared by injection molding with an injection molding die has the same size as the light guiding plate 50, and prisms 62An are formed by making the same grooves as in the light guiding plate 50, on a light reflecting surface 62. Further, grooves 63Am having a radius of curvature R=0.1 mm, in m (m is a natural number) rows were formed at intervals of pitch P=0.1 mm on a light emitting surface 63 of the light guiding plate 60.

The light from a light source (not shown) composed of three light emitting diodes disposed at a predetermined pitch was guided through a light incident surface 61 of the light guiding plate 60, and the X axis direction luminance of the light emitted from the light emitting surface 63, and the Y axis direction luminance were measured to find an emission angle distribution. Like the case of the light guiding plate 50, letting the measuring point be a central position of the light emitting surface 63, on the X axis, the light incident surface 61 side is a negative direction, and the light guide direction is a positive direction, whereas on the Y axis, the right side with respect to the light guide direction is a positive direction, and the left side is a negative direction.

Figure 16A:
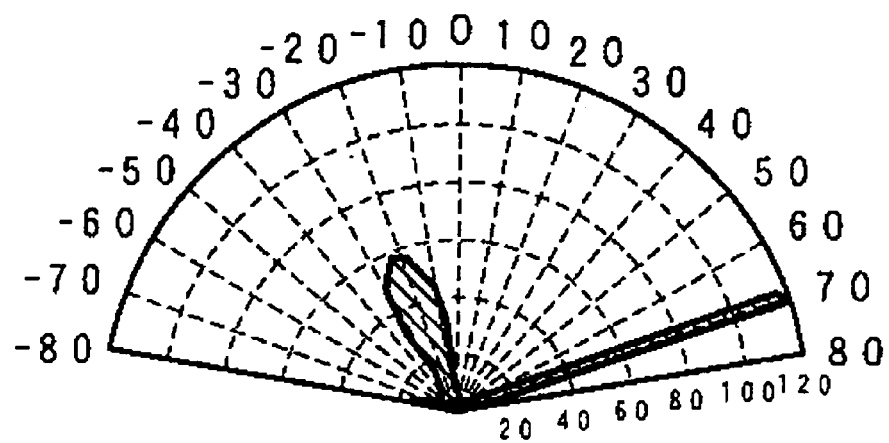
FIG. 16(a) is a diagram showing an emission angle distribution of the luminance in the X axis direction of the light guiding plate shown in FIG. 15.
Figure 16B:
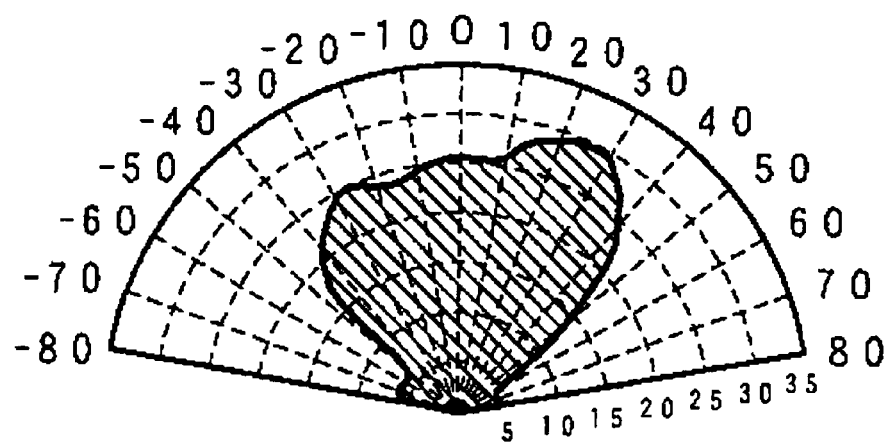
FIG. 16(b) is a diagram showing an emission angle distribution of the luminance in Y axis direction.

The emission angle distribution in the X axis direction of the light guiding plate 60, and the emission angle distribution in the Y axis direction are shown in FIGS. 16(a) and 16(b), respectively. The symbol 0° shown in FIGS. 16(a) and 16(b) indicates the normal of the light emitting surface 63. For example, if the luminance distribution is concentrated in the vicinity of 0° in each of FIGS. 16(a) and 16(b), it can be said that both of the X axis direction component and the Y axis direction component in the light emitted from the light emitting surface 63 are condensed to the normal of the light emitting surface 63.

As shown in FIG. 16(a), the distribution in the vicinity of −20° to 0° is high in the X axis direction, as in the case of the light guiding plate 50. This shows that the light is condensed in the normal direction of the light emitting surface 63 in the X axis direction.

As shown in FIG. 16(b), the distribution in the vicinity of −60° to 50° is high in the Y axis direction. Especially, the luminance level is stable in the vicinity of −30° to 30°. This clearly shows the effect of the formation of the plurality of the grooves 63Am, and shows that at the curved surface portions of the grooves 63Am within the light guiding plate 60, the light guided within the light guiding plate 60 is reflected so as to cause internal diffusion in the Y axis direction, and incident on the prisms 62An, and then emitted from the light emitting surface 63.

Therefore, this indicates that in the light guiding plate 60, the non-uniformity of luminance in the Y axis direction, which was observed in the light guiding plate 50, is completely eliminated, and the light luminance in the Y axis direction is homogenized and emitted from the light emitting surface 63.

EXPERIMENT 3

Figure 17:
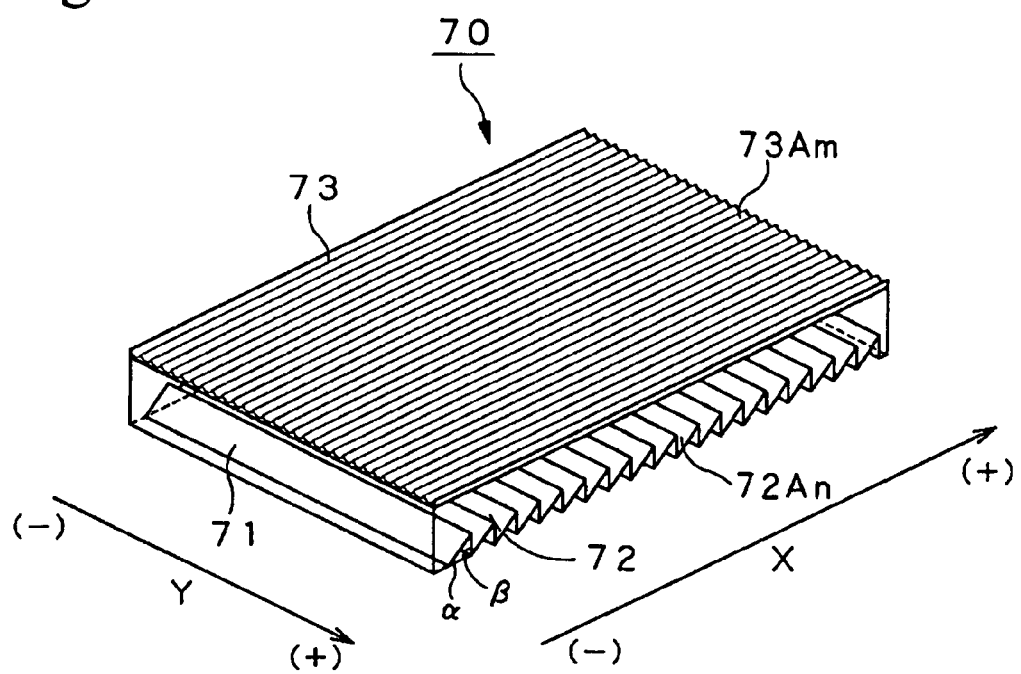
FIG. 17 is a diagram to explain a light guiding plate prepared as one embodiment, in which a plurality of prisms are formed on a light reflecting surface, and a plurality of grooves, whose pitch is different from that in FIG. 15, are formed on a light emitting surface.

As shown in FIG. 17, a light guiding plate 60 prepared by injection molding with an injection molding die has the same size as the light guiding plate 70, and prisms 72An are formed by making the same groove as in the light guiding plate 50, on a light reflecting surface 72. Further, grooves 73Am having a radius of curvature R=0.1 mm, in m (m is a natural number) rows are formed at intervals of pitch P=0.15 mm on a light emitting surface 73 of the light guiding plate 70.

The light from a light source (not shown) composed of three light emitting diodes disposed at a predetermined pitch was guided through a light incident surface 71 of the light guiding plate 70, and the X axis direction luminance of the light emitted from the light emitting surface 73, and the Y axis direction luminance were measured to find an emission angle distribution. Like the case of the light guiding plate 50, letting the measuring point be a central position of the light emitting surface 73, on the X axis, the light incident surface 71 side is a negative direction, and the light guide direction is a positive direction, whereas on the Y axis, the right side with respect to the light guide direction is a positive direction, and the left side is a negative direction.

Figure 18A:
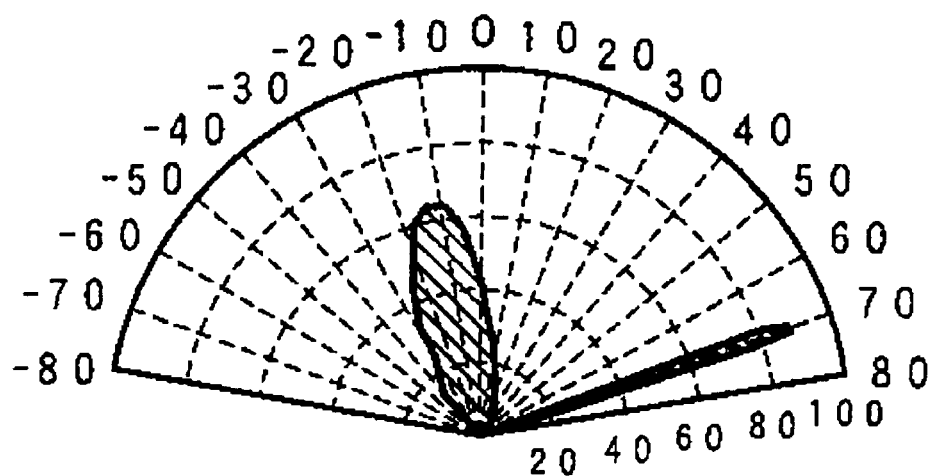
FIG. 18(a) is a diagram showing an emission angle distribution of the luminance in X axis direction of a light guiding plate shown in FIG. 17.
Figure 18B:
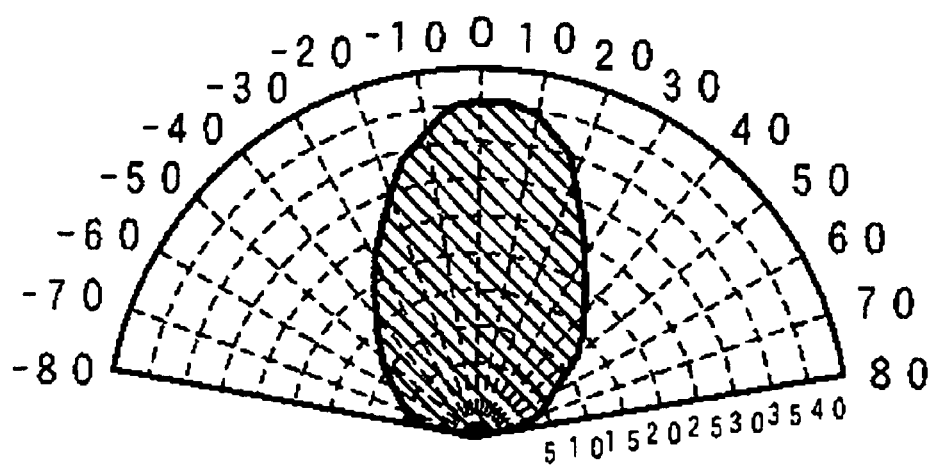
FIG. 18(b) is a diagram showing an emission angle distribution of the luminance in Y axis direction.
Figure 19:
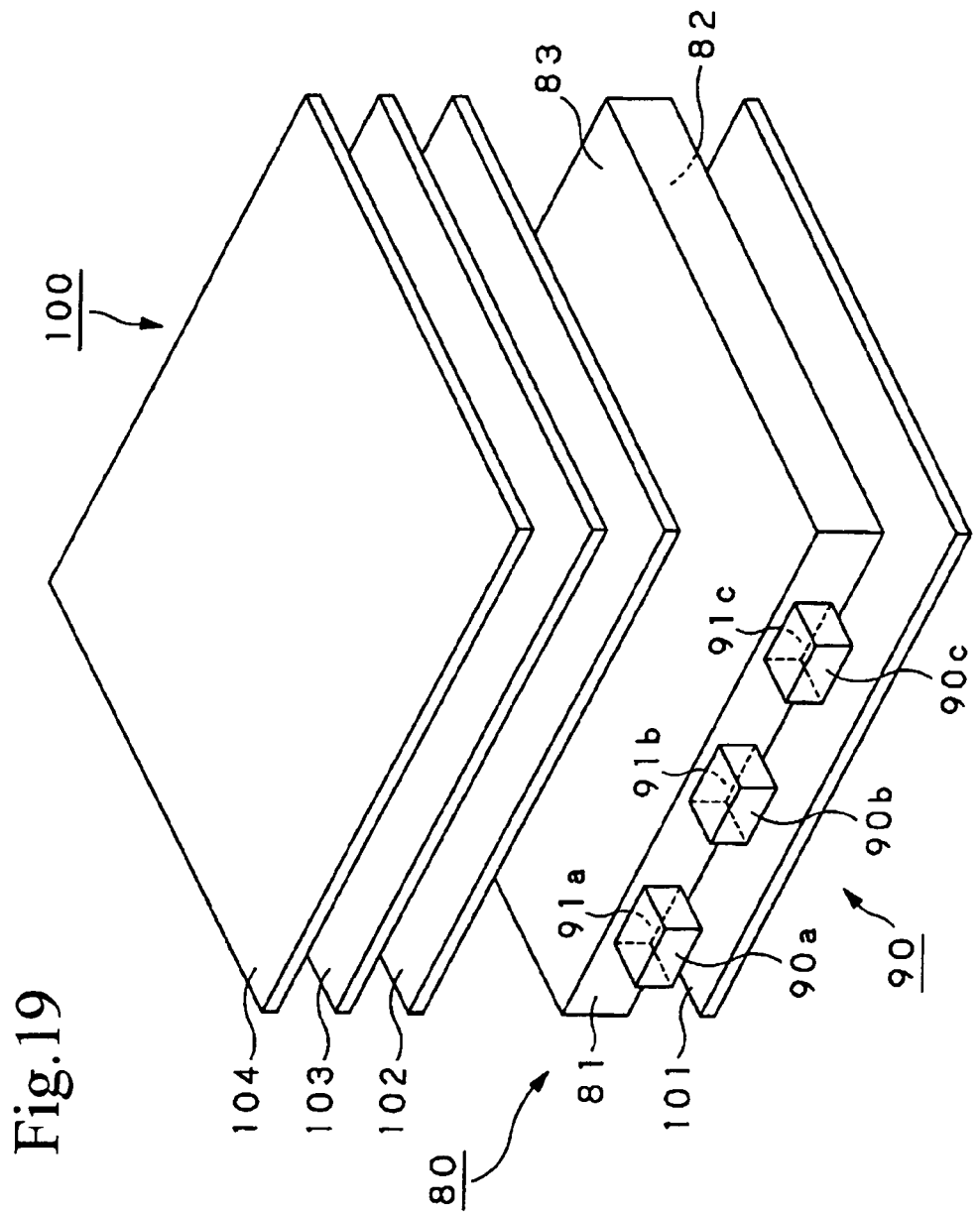
FIG. 19 is a diagram to explain a configuration of a backlight unit, which is shown as technique of related art.
Figure 20:
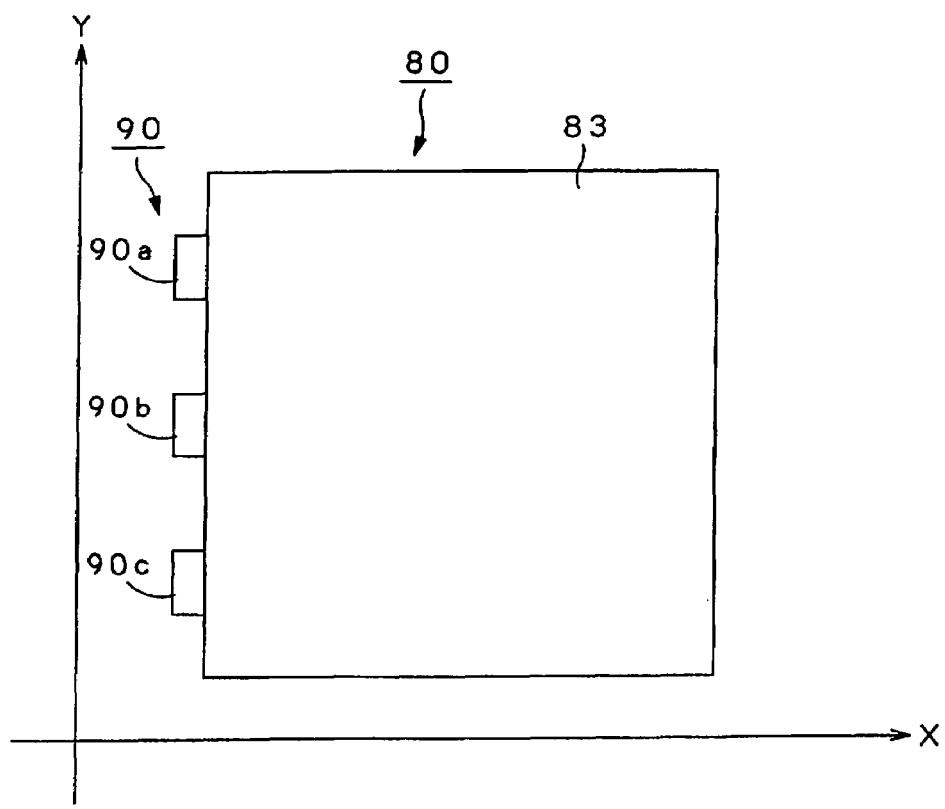
FIG. 20 is a diagram to explain an XY coordinate axis set to a light guiding plate provided with a backlight unit.

The emission angle distribution in the X axis direction of the light guiding plate 70, and the emission angle distribution in the Y axis direction are shown in FIGS. 18(a) and 18(b), respectively. The symbol 0° shown in FIGS. 18(a) and 18(b) indicates the normal of the light emitting surface 73. For example, if the luminance distribution is concentrated in the vicinity of 0° in each of FIGS. 18(a) and 18(b), it can be said that both of the X axis direction component and the Y axis direction component in the light emitted from the light emitting surface 73 are condensed to the normal of the light emitting surface 73.

As shown in FIG. 18(a), the distribution in the vicinity of −20° to 0° is high in the X axis direction, as in the case of the light guiding plate 50. This shows that the light is condensed in the normal direction of the light emitting surface 73 in the X axis direction.

As shown in FIG. 18(b), the distribution in the vicinity of −60° to 60° is high in the Y axis direction. Especially, the luminance level is stable in the vicinity of −20° to 10°, and the luminance is far higher than that in the light guiding plate 60.

This clearly shows the effect of the formation of the plurality of the grooves 73Am, and shows that at the curved surface portions of the grooves 73Am within the light guiding plate 70, the light guided within the light guiding plate 70 is reflected so as to cause internal diffusion in the Y axis direction, and incident on the prisms 72An, and then emitted from the light emitting surface 73.

Therefore, this indicates that in the light guiding plate 70, the non-uniformity of luminance in the Y axis direction, which was observed in the light guiding plate 50, is completely eliminated, and the light luminance in the Y axis direction is homogenized and emitted from the light emitting surface 63. Additionally, in the light guiding plate 70, the luminance in the Y axis direction is extremely higher than the light guiding plate 60 having improvements in the non-uniformity of luminance of the light guiding plate 50. This indicates that the Y axis direction component of the light emitted from the light emitting surface 73 has a high luminance.

It should be understood by those skilled in the art that various modifications, combinations, sub-combinations and alterations may occur depending on design requirements and other factors insofar as they are within the scope of the appended claims or the equivalents thereof.

What is claimed is:

1. A light guiding plate comprising:
   a light reflecting surface provided by a first main surface of the light guiding plate;
   a light emitting surface provided by a second main surface of the light guiding plate;
   a light incident surface provided by a side surface of the light guiding plate;
   wherein a Z axis direction is defined as a direction orthogonal to said first and second main surfaces, an X axis direction is defined as a direction orthogonal to said light incident surface, and a Y axis direction is defined as a direction orthogonal to said z-axis direction and said x-axis direction; and
   wherein said light reflecting surface includes a plurality of prisms formed along the x-axis direction of the light reflecting surface and projecting both inwardly towards the light emitting surface and outwardly away from said light emitting surface, a lengthwise direction of the prisms being formed in the y-axis direction, said cross-sectional shape of said prisms includes an inwardly extending triangle and an outwardly extending triangle, such that said inwardly extending triangle and said outwardly extending triangle share an edge that extends substantially orthogonal to the light reflecting surface, and wherein the prisms are comprised of a light-transmitting medium that allows a portion of a light incident on one part of a prism to travel through the prism and exit at another part of the prism.

2. A light guiding plate comprising:
   a light reflecting surface provided by a first main surface of the light guiding plate;
   a light emitting surface provided by a second main surface of the light guiding plate;
   a light incident surface provided by a side surface of the light guiding plate;
   wherein a Z axis direction is defined as a direction orthogonal to said first and second main surfaces, an X axis direction is defined as a direction orthogonal to said light incident surface, and a Y axis direction is defined as a direction orthogonal to said z-axis direction and said x-axis direction; and
   wherein said light reflecting surface includes a plurality of prisms formed along the x-axis direction of the light reflecting surface and projecting inwardly towards the light emitting surface, a lengthwise direction of the prisms being formed in the y-axis direction, said cross-sectional shape of said prism being a rounded trapezoidal-shape, and wherein the prisms are comprised of a light-transmitting medium that allows a portion of a light incident on one part of a prism to travel through the prism and exit at another part of the prism; and
   further wherein said light emitting surface includes a plurality of grooves formed along the y-axis direction of the light emitting surface and projecting inwardly towards the light reflecting surface, a lengthwise direction of said grooves being in the X axis direction, and further wherein said light emitting surface includes a plurality of grooves formed along the y-axis direction of the light emitting surface and projecting inwardly towards the light reflecting surface, a lengthwise direction of said grooves being in the X axis direction; and
   wherein said plurality of grooves formed along the y-axis direction of the light emitting surface are formed of a plurality of cylindrically-shaped inward projections having a radius of curvature.

3. The light guiding plate of claim 1, and further wherein said light emitting surface includes a plurality of grooves formed along the y-axis direction of the light emitting surface and projecting inwardly towards the light reflecting surface, a lengthwise direction of said grooves being in the X axis direction; and wherein said plurality of grooves formed along the y-axis direction of the light emitting surface are formed of a plurality of cylindrically-shaped inward projections having a radius of curvature.

4. A light guiding plate comprising:

a light reflecting surface provided by a first main surface of the light guiding plate;

a light emitting surface provided by a second main surface of the light guiding plate;

a light incident surface provided by a side surface of the light guiding plate;

wherein a Z axis direction is defined as a direction orthogonal to said first and second main surfaces, an X axis direction is defined as a direction orthogonal to said light incident surface, and a Y axis direction is defined as a direction orthogonal to said z-axis direction and said x-axis direction; and wherein said light reflecting surface includes a plurality of prisms formed along the x-axis direction of the light reflecting surface and projecting inwardly towards the light emitting surface, a lengthwise direction of the prisms being formed in the y-axis direction, said cross-sectional shape of said prism is trapezoid-like and includes a surface having arbitrary irregularities, and wherein the prisms are comprised of a light-transmitting medium that allows a portion of a light incident on one part of a prism to travel through the prism and exit at another part of the prism, and further wherein said light emitting surface includes a plurality of grooves formed along the y-axis direction of the light emitting surface and projecting inwardly towards the light reflecting surface, a lengthwise direction of said grooves being in the X axis direction; and wherein said plurality of grooves formed along the y-axis direction of the light emitting surface are formed of a plurality of cylindrically-shaped inward projections having a radius of curvature.

5. A light guiding plate comprising:

a light reflecting surface provided by a first main surface of the light guiding plate;

a light emitting surface provided by a second main surface of the light guiding plate;

a light incident surface provided by a side surface of the light guiding plate;

wherein a Z axis direction is defined as a direction orthogonal to said first and second main surfaces, an X axis direction is defined as a direction orthogonal to said z-axis direction and said x-axis direction; and wherein said light reflecting surface includes a plurality of prisms formed along the x-axis direction of the light reflecting surface and projecting inwardly towards the light emitting surface, a lengthwise direction of the prisms being formed in the y-axis direction, a first base angle of said prisms being an angle from 50° to 60°, and a second base angle being an angle from 70° to 90°, and wherein the prisms are comprised of a light-transmitting medium that allows a portion of a light incident on one part of a prism to travel through the prism and exit at another part of the prism; and further wherein said light emitting surface includes a plurality of grooves formed along the y-axis direction of the light emitting surface and projecting inwardly towards the light reflecting surface, a lengthwise direction of said grooves being in the X axis direction, and wherein said plurality of grooves formed along the y-axis direction of the light emitting surface are formed of a plurality of cylindrically-shaped inward projections having a radius of curvature.

6. A back light apparatus comprising:

a light guiding plate including:

a light reflecting surface provided by a first main surface of the light guiding plate;

a light emitting surface provided by a second main surface of the light guiding plate;

a light incident surface provided by a side surface of the light guiding plate;

wherein a Z axis direction is defined as a direction orthogonal to said first and second main surfaces, an X axis direction is defined as a direction orthogonal to said light incident surface, and a Y axis direction is defined as a direction orthogonal to said z-axis direction and said x-axis direction; and wherein said light reflecting surface includes a plurality of prisms formed along the x-axis direction of the light reflecting surface and projecting inwardly towards the light emitting surface, a lengthwise direction of the prisms being formed in the y-axis direction, a first base angle of said prisms being an angle from 50° to 60°, and a second base angle being an angle from 70° to 90°, and wherein the prisms are comprised of a light-transmitting medium that allows a portion of a light incident on one part of a prism to travel through the prism and exit at another part of the prism;

a light source having a plurality of light emitting elements disposed along said light incident surface;

a reflecting sheet disposed adjacent said light reflecting surface of said light guiding plate;

a diffusing sheet disposed adjacent said light emitting surface of said light guiding plate;

a lens sheet disposed on a surface of said diffusing sheet, said surface being opposite said light guiding plate, wherein the light received by the lens sheet from the light emitting surface of the light guiding plate is deflected and a tilt of the light received by the lens plate in the y-axis direction approaches zero; and further wherein said light emitting surface includes a plurality of grooves formed along the y-axis direction of the light emitting surface and projecting inwardly towards the light reflecting surface, a lengthwise direction of said grooves being in the X axis direction; and wherein said plurality of grooves formed along the y-axis direction of the light emitting surface are formed of a plurality of cylindrically-shaped inward projections having a radius of curvature.

* * * * *